Patented Nov. 29, 1949

2,489,743

UNITED STATES PATENT OFFICE 2,489,743

PROCESS FOR TREATING FRESH FRUIT IN PREPARATION FOR MARKETING

Ernest M. Brogden, Orlando, Fla., assignor to Carpenter Co., Orlando, Fla., a copartnership Application June 27, 1946, Serial No. 679,853

7 Claims. (Cl. 99—168)

This invention relates to the treatment of fresh fruit in preparation for market, which involves treating the surface of the fruit with a fluent material which may be a liquid or an emulsion, for various purposes as will appear. The term "fruit" includes tree-borne fruit of general rotund shape, such as citrus, apple, peach, plum, as well as tomatoes, melons, etc.

The general object of the invention is the provision of a method which comprises the steps of wetting the entire surface of the fruit with a liquid or emulsion and then withdrawing from the general rotund surface of the fruit all surplus liquid or emulsion. By the term "general rotund surface" is meant that part of the surface which by virtue of its convex shape will contact the plane surface of a slightly yielding blotting medium when the fruit is rolled upon said medium, under pressure of its weight or greater pressure, and which term excludes the depression at the stem end. By "surplus liquid or emulsion" is meant all liquid or emulsion in the form of drops, droplets, or pinheads, or which may collect as islands on the surface, or which is in sufficient masses to run together gravitationally. In other words, surplus liquid or emulsion means all liquid or emulsion beyond a microscopic film remaining on the surface of the fruit, which may be correctly described as dampness.

One of the objects of the invention is to provide a method of treating fresh fruit by wetting the surface including the stem end and the surfaces of tissue exposed by scratches or larger wounds, with a solution of a substance lethal to organisms which produce decay, or requisite concentration and for a period of time sufficient to ensure efficient inhibiting action for protection of the fruit against deterioration through the development of mold and other decay producing organisms, then without dilution of the solution adhering to the fruit, and absorbed into the tissue exposed in the wounds, to remove the surplus solution from the general rotund surface thereof down to the state of mere dampness, leaving the solution with undiminished strength in the stem end and in such wounds as may be present. Retention of the solution in full strength and full volume in the infection vulnerable parts of the fruit surface greatly extends the period of protection as contrasted with the conventional practice of rinsing the fruit in water following treatment with the antiseptic solution, for the purpose of removing surplus solution, which if left shows an appreciable white bloom upon drying, particularly in an atmosphere of low humidity. Such rinsing incidentally dilutes the solution at the stem end and in wounds, impairing its protective strength. The microscopic film of solution left upon the general rotund surface of the fruit by the process of the present invention is insufficient to show any bloom upon drying.

Another object of the invention is to provide a method of treating fresh fruit to retard shrinkage, and incidentally to apply a polishing effect to the surface of the fruit, by wetting the surface with an aqueous emulsion of wax or waxes and removing the surplus emulsion from the general rotund surface of the fruit.

A further object of the invention is to provide a method of preparing fresh fruit for marketing by first subjecting it to the decay inhibiting treatment as hereinbefore described, and then subjecting it to the shrinkage retarding and polishing agent applying step. The condition of mere dampess which attends the surface of the fruit at the end of the decay inhibiting step is the ideal condition of the surface for the application of the aqueous wax emulsion in order to ensure complete wetting of the fruit by the emulsion.

Another object of the invention relates to the removal of spray residue from fruit by wetting the surface with a liquid or emulsion capable of suspending the particles of spray residue or reacting therewith, the liquid or emulsion being applied and removed by a blotting medium which functions as a mechanical detergent in breaking the adhesion of the spray residue particles to the surface of the fruit.

Other objects of the invention will appear as the detailed disclosure of the process unfolds.

In describing the process, reference is had to the following drawing in which.

Figure 1:
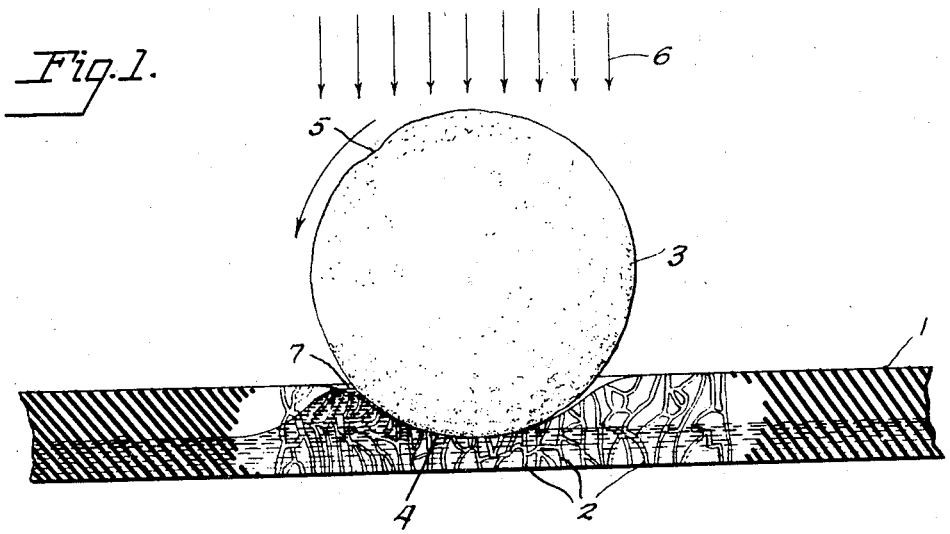
Figure 1 is a longitudinal section through a sheet of foamed rubber with a fruit resting gravitationally thereupon.
Figure 2:
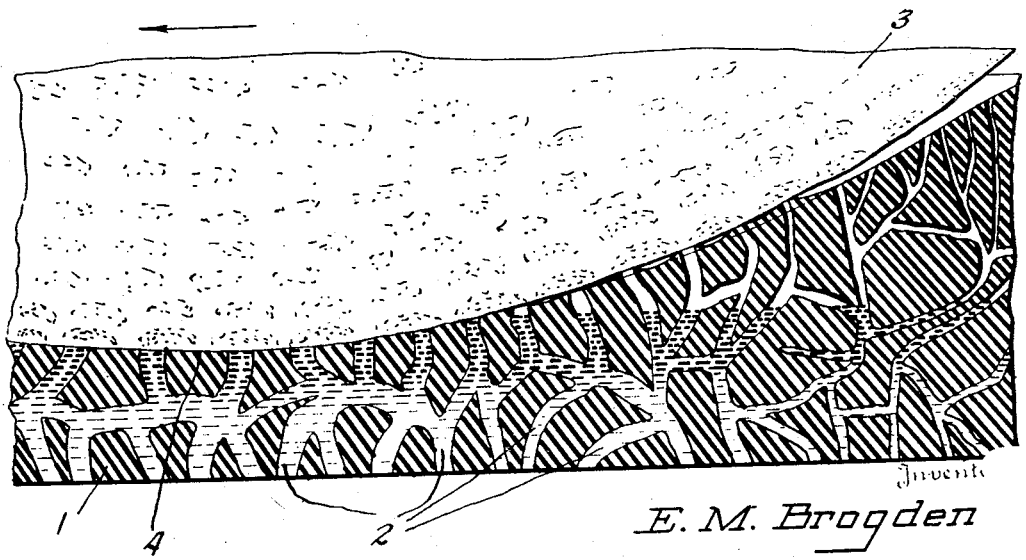
Figure 2 is a fragmentary view on an enlarged scale illustrating the action of the foamed rubber with respect to the fruit surface.

The process may best be described in connection with a single apparatus element, a sheet of "foamed rubber" which I have employed as the blotting medium, and in certain phases of the invention as the means by which the liquid or emulsion is applied. The rubber may be either natural or synthetic. The sheet is compressible, that is to say, it yields under the weight of a fruit. The upper surface of the sheet is normally plane. The thickness of the sheet is not vital to the invention excepting that it should be sufficiently thick to extend above the liquid table which it is capable of sustaining by capillarity. For oranges I have used a sheet about one-half inch thick.

"Foamed rubber" is a commercial product, characterized by the presence of a multiplicity of intercommunicating cells or foramina closely distributed throughout its texture and opening in the surfaces of the sheet. If liquid is poured on top of the sheet, it will quickly discharge through the bottom, and laterally. Due to capillarity, part of the liquid will be retained in the mass of the sheet. At the time of its use, the sheet must be thoroughly wet in order to function effectively.

Wetting may be accomplished by immersing the sheet in water or the liquid with which the fruit is to be treated and kneading or squeezing it while submerged so as to displace the air in the cells with water, thereby to wet the surface of the cells. Surplus water may be squeezed out or it will drain out automatically almost at once after the sheet is taken from the water. In either case, a certain amount of water remains in the mass. This is believed to play an important part in the blotting function, as will appear.

Experiments with the foamed rubber appear to show that the blotting action of the sheet as it is employed in the present process is more than a phenomenon of mere capillarity.

If a globular object is dipped in water so that a drop of water hangs from its under surface, and in this position is brought down towards the foamed rubber sheet until the apex of the drop touches the sheet, part of the drop will be sucked in by the sheet, but the base portion of the drop will remain in adherence to the object.

If the globular object is dipped in water so that a drop hangs from its under surface as in the first experiment and in this position is brought down toward the foamed rubber sheet until the object makes contact with the sheet, and the object is then lifted vertically, it is found that most of the drop has been absorbed but the base portion still remains adhering to the object.

(a) The globular object is now wetted so that drops of water adhere to various points on its surface. It is placed upon the foamed rubber sheet which it sinks somewhat, forming a shallow depression in the sheet. It is rolled rapidly across the sheet. The surface which comes up on the trailing side shows vestiges of the drops which were overrun on the leading side.

The phenomenon observed in the above experiments are believed to be entirely due to capillarity and it is apparent from the fact that parts of the drops of water remain on the surface of the object that capillarity alone is insufficient to remove surplus water from the object to the extent that a condition of mere dampness exists on its surface.

(b) Experiment a is now repeated, but the object is rolled slowly across the sheet. The surface which comes up on the trailing side is now found to be devoid of all drops, droplets, puddles or even pinpoints of water. It is merely damp.

In searching for a logical explanation of the difference in the results noted in experiments a and b, the following observations and deductions have been made.

The cells 2 of the foamed rubber sheet 1 substantially all contain some water, either clinging to their walls by surface tension, or filling them, according to the amount of water saturating the sheet. The weight of the object 3 produces a depression 4 in the sheet. It reduces the thickness of the sheet by collapsing or condensing the cells beneath the object, forcing the water out of these cells, which fills the cells in an outlying region adjacent the condensed cells. The displaced water does not diffuse through the mass of the sheet, but due to surface tension and capillarity it remains concentrated in this outlying region. The point of maximum condensation of the cells produced by the weight of the object is, of course, directly beneath the center of gravity of the object.

Now when the object is rolled along the sheet, the center of gravity shifts and through the inherent resiliency of the rubber the compressed cells on the trailing side quickly recover their normal open shape. The inertia of the displaced water, probably aided by surface tension and capillarity, prevents the water from immediately returning into the reexpanded cells from which it was displaced, so that if the object is rolled sufficiently slowly, as in experiment b, so that the mouths of the surface cells on the trailing side can maintain contact with the surface of the object during a material part of the expanding phase of said cells, they act as suction cups, withdrawing water from the surface of the object with relatively great force. If the object is rolled too rapidly across the sheet, as in experiment a, the surface of the object on the trailing side, leaves the surface of the sheet before the surface cells have materially reexpanded, and their suction effect is lost. However, it is not to be inferred that the rolling speed of the object must be unduly slow to effect the desired thorough blotting action, for I have successfully employed the foamed rubber as a blotting agent, in the treatment of fruit on a commercial scale.

The process of the present invention will now be described as applied specifically to oranges. The orange is to be fortified against decay and undue shrinkage, and polished. After a preliminary washing step, which is not part of the present invention, the oranges are submerged in a bath of an aqueous solution of borax of mold or rot inhibiting concentration. The strength of the solution is about 6 to 8 ounces of borax to 1 gallon of water. It is desirable to hold the temperature of the solution at about 115° F., since this temperature is high enough to keep the borax from crystallizing out of the solution, and to produce sufficient low viscosity of the solution to permit it freely to enter minute wounds such as scratches on the surface of the fruit, yet not high enough to injure the fruit. The oranges are kept submerged in this solution for a period of four or five minutes, to give time for the solution to penetrate beneath the calyx at the stem end and to be absorbed into tissue exposed in scratches or other ruptures of the skin. The solution or the fruit, or both, are preferably agitated to assure repeated contact of the borax solution with the entire surface.

At the conclusion of the borax bath the oranges are immediately placed upon a sheet of foamed rubber and rolled thereupon in such directions as to bring all parts of the general rotund surface of the orange into contact with the sheet. Since each orange rolls in a depression which it makes in the foamed rubber, a relatively wide zone of its surface will be blotted at a time, minimizing the number of direction changes in the motion of rolling, necessary to remove surplus solution from the entire rotund surface. Only one passage of an area of the orange surface over the sheet is required to reduce the moisture content on that area to a state of uniform mere dampness.

The depression 5 at the stem end will not contact the foamed rubber sheet and the borax solution at this point will not be disturbed by the blotting. Neither will the blotting remove any of the absorbed borax from the wounds. Since there is no rinsing step, such as now uniformly practiced, following the conventional borax treatment for the purpose of preventing surplus solution from drying into a white bloom on the surface of the fruit, there is no dilution of the residual borax solution in the stem end and in the wounds, the solution remaining at these points in its original lethal strength.

The thoroughness of the blotting effected by the foamed rubber leaves so minute and uniform a film of borax solution on the rotund surface of the fruit that no bloom appears upon drying even under atmospheric conditions of low humidity.

The oranges at this stage carry enough borax at the stem end and in the wounds to fully protect them from the development of stem end rot and mold decay during the normal period of marketing. The characteristic of this first step of the invention is the removal of surplus borax solution without the dilution of the solution.

Following the borax treatment step, the oranges are immediately transferred to another area of the foamed rubber, and while still damp with the borax solution, are sprayed or deluged with a wax emulsion, the spray being indicated at 6 in Figure 1. The oranges are preferably in rolling motion while the wax emulsion is being applied to ensure that all parts of the surface are contacted by the emulsion. The dampness of the surface of the orange at the time of application of the wax emulsion facilitates the uniform wetting of the surface by the emulsion. The emulsion which drains from the surface of the oranges goes into the foamed rubber. A certain amount is held in the foamed rubber by capillarity and forms a water table below the surface of the foamed rubber sheet. Any excess above the amount retained by capillarity discharges through the sheet which should be so supported as to provide for this discharge.

The purpose of the emulsion is to provide the orange with a thin coating of wax, primarily to retard shrinkage, and secondarily, to provide for a polish. It is known that, while retardation of the shrinkage is beneficial to the keeping qualities of the fruit, excessive inhibition of respiration creates anaerobic conditions within the fruit that deteriorate its palatability and promote spoilage. The coating must be substantially continuous over the entire orange, but sufficiently thin to promote some breathing. It is quite important that the applied wax coating shall not crack or peel, nor that it shall give the fruit an artificially waxed appearance.

An example of the emulsion employed in the subject process is an aqueous emulsion of paraffin, and carnauba waxes, paraffin being used on account of its ready spreading qualities, and carnauba which is harder than paraffin, because of its superior polishing quality; the amount of the waxes by weight being about 5½% of the weight of the emulsion and the ratio of paraffin to carnauba being about 60 to 40%. The emulsion contains also about 2½% of borax in solution, so that the total amount of solids in the emulsion is about 10%. The purpose of the borax is to prevent dilution by the emulsion, of the borax residing in the stem end and wounds on the surface of the fruit. The emulsion is applied warm, to hold the borax in solution, and to reduce the viscosity of the emulsion. For best results, care must be taken not to raise the temperature of the emulsion as high as the melting point of the waxes present. 115° F. has been found an optimum temperature. This is lower than the melting point of paraffin and considerably lower than the melting point of the carnauba. Under the temperature conditions as described, the emulsion may be regarded as an aqueous dispersion phase consisting of minute water globules containing the borax in solution, surrounded by the wax phase in the form of solid wax particles of colloidal size suspended in the interfaces of the aqueous nuclei.

Preferably, the orange is sprayed or showered with the emulsion while being rolled slowly along over the foamed rubber sheet in various directions to thoroughly drench its entire surface three or four times. Then the drenching is discontinued and the orange rolled upon the sheet until the surplus moisture has been blotted off. The blotting action is believed to be a combination of capillary attraction and positive suction effected in the manner previously described, and is so effective as to leave a film of wax of such thinness that it is estimated that 8 pounds of wax will cover 25,000 square feet of fruit surface. Upon the assumption that the wax particles of the emulsion are solid, it would appear that the blotting action is selective, withdrawing the water phase and leaving the wax particles adherent to the surface of the orange in contiguous arrangement forming a continuous film.

Continuity of the wax film is probably improved by the mechanical action of the foamed rubber sheet. As has been previously stated, the weight of the orange creates a depressed seat for the orange. The rubber is stretched in forming the depression, enlarging the mouths of the foramina which open in the depressed surface. As the orange rolls and the depression shifts, the mouths in contact with the orange on the leading side progressively expand until they reach the point of greatest depth and then progressively contract on the trailing side. The rubber between the mouths thus executes a wiping action against the surface of the orange, spreading the wax particles which it contacts, against the surface.

This spreading action of the foamed rubber seems to be the explanation for the somewhat paradoxical observation that the more of the emulsion that is removed by the blotting, the more the shrinkage of the fruit is retarded. If, for example, the orange is rolled on the rubber only sufficiently to bring the surface once into blotting contact with the rubber, while all surplus emulsion present as drops or droplets appears to have been removed, the surface of the fruit will be more damp than if the rolling is continued to bring the surface a number of times into contact with the rubber. The rate of shrinkage of fruit which has been subjected to the protracted rolling is found to be less than that of fruit which has contacted the rubber but once. This is believed due to the fact that the mechanical wax spreading action of the rubber more thoroughly welds the solid wax particles deposited upon the surface of the fruit from the emulsion, into a continuous coating.

The blotting action does not extend to such emulsion as may be in the stem end depression or in the depths of the wounds, but is so thorough that the general rotund surface of the orange feels dry to the touch. Presence of the wax film may at this stage be demonstrated by pouring emulsion upon the freshly blotted orange. The emulsion being predominately aqueous, will run off the surface or form channels or isolated drops without wetting the orange.

The above description illustrates an elemental way of performing the method manually. In treating oranges on a commercial scale, they could be placed in plurality upon the upper end of an inclined sheet of foamed rubber, permitted to roll downward by gravity, this movement being compounded with a lateral rolling movement, the oranges passing progressively through a drenching shower of emulsion near the top of the sheet and then moving downward beyond the drenching zone to a lower portion of the sheet where the surplus emulsion is blotted off.

As an alternative to applying the emulsion to the fruit in the form of a spray or shower, the foamed rubber sheet may be sufficiently saturated with emulsion so that when the orange rolls upon it, the weight of the orange forces up a puddle of emulsion 7 in the leading side of the depression, into which puddle the orange rolls and is wetted, the surplus emulsion being blotted off by the rubber which rises up against the orange on the trailing side. Since the stem end depression may in rolling, carry down an air bubble and thus be excluded from contact with the puddle, this method of wetting with the emulsion will probably not be found as reliable as the application of the emulsion by an overhead spray or shower.

In the commercial practice of the invention the fruit goes through a drying and polishing step following the emulsion treatment, which steps are per se no part of the present invention. The amount of moisture on the surface of the fruit upon leaving the rubber is so small as to make the drying step a very simple operation.

The complete process as above described, including the borax bath step and the wax emulsion step, is applied to oranges, grapefruit and lemons. Apparatus has been devised for treating these fruit on a commercial scale as a continuous process, which will be made the subject of a separate application for patent.

The process of the present invention is equally applicable to the preservation of peaches, apricots and similar fruit.

The peach deteriorates very rapidly after it is removed from the tree. Most of them are picked when they are "mature green," which means the peach is so green and hard that it is not edible at all. In the commercial process of preparing them for market, the peaches are run through defuzzing brushes which remove a large part of the fuzz, then graded, packed, and put immediately into refrigerated cars which are kept iced during the period of transportation. Notwithstanding the fact that they are packed while green and immediately put under refrigeration, they cannot be shipped a distance of more than five or six days, and the marketable life is only three or four days after they are taken out of the car.

By slowing up respiration, and fortifying the fruit against decay, the life of the peach can be extended for several days. This makes it practicable to leave the peach on the tree for two or three days longer, if desired, in which time it improves materially in flavor and color, and still has a longer marketable life at the consumer's end of its journey. But prior to the subject invention, no practical process has been known for treating the peach to secure these desired results. This is because the peach is temperamental. The nature of its skin is such that it will not stand washing nor vigorous brushing, such as is required to apply a wax coating according to the method widely practiced in the treatment of citrus fruit. Furthermore, the coating must be extremely thin to avoid cutting down the rate of shrinkage too far, and it must not be apparent to the eye or have any suggestion of polish.

In applying the process of the present invention to peaches, they are defuzzed as usual. The borax bath which was used in the case of oranges is omitted, since washing is deleterious to the peach. The defuzzed peaches are directly subjected to drenching by a wax emulsion which may be of the same type as that employed in the wax coating of citrus fruit, the emulsion being applied warm, but at a temperature below the melting point of its wax content. The drenching is so thorough as to cover the entire surface of the peach with emulsion. Since a very thin coating is desired, the percentage of waxes in the emulsion may be less than is optimum for citrus fruit. An emulsion with 4½% wax solids has been used with success. For the control of brown rot the emulsion should contain borax. A strength of from 2½% to 3% of borax has been found adequate.

The peaches are deluged with the emulsion while being rolled on a foamed rubber sheet which preferably should be kept so saturated in the zone of the shower that a puddle of emulsion will rise against the leading side of the peach in the depression created by its weight.

The process has a new and important function when applied to peaches, and as will later appear, to apples, which is the removal of spray residue. The wax emulsion itself is a good detergent. The peaches are preferably rolled while being showered with the emulsion to bring the emulsion repeatedly into contact with the entire surface and to effect the repeated withdrawal of the surplus emulsion, containing the spray residue, by the peculiar blotting action of the rubber in which both capillarity and forceful suction play their part. The mechanical stretching action of the rubber under the shifting weight of the peach creates minute translatory movements of the rubber against the surface of the peach, insufficient to harm the peach skin, but effective to dislodge adherent spray residue. The movement of the rubber which forms the edges of the mouths of the foramina which expand and contract in contact with the surface of the peach, are particularly effective in performing this detergent function.

After a rolling period under the emulsion shower, the peaches are rolled onto a less saturated area of foamed rubber, where they are rolled some more, to finally blot off the surplus emulsion, leaving the surface covered with a film of fine solid wax particles welded into continuity largely by the wiping movement of the rubber against the surface, the latter being still slightly damp with the residual borax solution from the emulsion. The degree of dampness ordinarily is so slight that it dries spontaneously without requiring special provision for drying. The wax film is imperceptible on the surface of the peach, yet it is capable of slowing down the rate of respiration from 45% to 50%, while its borax content is sufficient to inhibit the development of brown rot. The thinness of the coating prevents any visible crystallization of borax upon the surface.

The spray residue encountered in the treatment of peaches at present is generally sulphur. Growers would like to use poison, but are deterred through hitherto insurmountable obstructions to the removal of the spray residue. It is believed that the present process is so effective that it would bring the spray residue down within tolerance, even if a poison spray were used.

The preparation of apples for marketing involves not only measures for preventing storage scald, and for slowing up respiration to prolong the marketable life, but generally also the removal of spray residue. Light mineral oil is known to be efficacious in combating storage scald. This has been previously applied by wrapping the apples in oil treated paper. Such a method is only partially effective, since the paper does not touch all of the surface of the apple. More complete protection has been secured by incorporating a small amount of oil with the wax emulsion employed in coating the surface of the apple to retard shrinkage. But the removal of spray residue poses a problem. It is customary for the control of worms to spray apples heavily with an arsenical spray right up to near the time of picking. Such a spray is extremely adherent to the surface of the fruit. If the spraying is discontinued a sufficient time before picking and there is heavy rainfall, the amount remaining on the skin at picking time may be below tolerance, but growers are prone to spray too close to picking time, so that the amount of arsenic on the fruit is generally considerably above tolerance and must be removed, otherwise there is risk of the shipment being condemned.

Removal of the spray residue to bring it down to tolerance is very difficult. The conventional method is to wash the apples in a strong solution of caustic alkali, then to remove the alkali by a fresh water rinse, after which the apples may be subjected to the desired preservative treatment.

The subject process as applied to apples combines the step of spray residue removal with the step of application of the protective coating. The foamed rubber and emulsion fruit treating process is much more efficient and economical than any method now in use. The procedure is much the same as with peaches, the apples being rolled beneath a shower or spray of emulsion upon a foamed rubber sheet, which is kept nearly saturated with emulsion so that a puddle of emulsion continually rises against the apple upon the leading side as it is rolled. The emulsion in this case contains a little light mineral oil in addition to the wax or waxes. The surface of the apple upon leaving the rubber on the trailing side is almost dry. The rolling beneath the spray or shower of emulsion is continued until the entire rotund surface of the apple has been repeatedly subjected to the alternate wetting and blotting action of the rubber. The suction of the rubber, pulling the emulsion off as it leaves the surface of the apple, seems to take practically all of the foreign matter off the surface of the fruit, while at the same time enough wax and oil goes to the skin of the fruit to retard the rate of shrinkage to the extent of 35% to 40%, and to stop storage scald, thus greatly prolonging the marketable life of the apple.

The mechanical detergent action of the rubber, stretching and contracting against the surface of the fruit, as described in the case of peaches, cooperates with the alternate wetting and suctional withdrawal of the emulsion to remove a larger percentage of the spray residue than the alkaline hydroxide method is generally able to accomplish.

Although the foamed rubber does not contact the convex stem end of the apple, the emulsion shower washes off some of the spray residue, and while some spray residue remains adjacent the stem end, the removal of the spray residue from the convex surface of the apple by the foamed rubber and emulsion process is so thorough that the average amount remaining, per pound of apples, is well below the limit of tolerance.

In some instances, where the arsenical residue on the apple is particularly heavy, it may be desirable to subject the apples to a preliminary alkaline hydroxide soak prior to the application of the foamed rubber and emulsion treatment. In the alkaline hydroxide method of spray residue removal, getting rid of the hydroxide is as much of a job as removing the arsenic by means of the hydroxide. It involves rinsing the apples by impinging jets of fresh water forcefully against the surface. This is frequently deleterious to the delicate skin of the apple. By the present process, when resort is had to the preliminary caustic spray removal soak, the rinsing step may be entirely omitted. The apples from the hydroxide bath are directly rolled upon foamed rubber to blot off the caustic solution to a state of substantial dryness, then subjected to the emulsion drench and repeated wetting with emulsion and suctional removal of the emulsion as disclosed. The emulsion removes substantially all traces of the hydroxide and provides the apple with the protective oil and wax film.

While I have in the above illustrative embodiment of the invention employed foamed rubber, a known commercial product, as the blotting instrumentality and in some instances as the applicator of the beneficiating liquid or emulsion, it will be understood by those skilled in the art that the use of other materials having a similar characteristic to foamed rubber is within the scope of the invention. It will also be understood that my invention does not extend to the emulsions per se, and that the technique employed in carrying the inventive concept into practice may be varied without transcending the scope of the invention.

What I claim as my invention is:

1. A process for treating citrus fruit comprising thoroughly wetting the fruit including the stem end and tissue exposed in skin wounds with an aqueous wax emulsion, said emulsion containing dissolved in its aqueous phase a decay inhibiting concentration of borax, and removing surplus emulsion therefrom to leave a thin, substantially uniform film on the generally rotund surface by rolling the fruit under pressure of its weight upon the foraminous, normally plane surface of a sheet of foamed rubber.

2. A process for treating citrus fruit comprising thoroughly wetting the fruit including the stem end and tissue exposed in skin wounds with an aqueous solution of borax in decay inhibiting concentration, removing surplus solution therefrom to leave a thin, substantially uniform film on the generally rotund surface by rolling the fruit under pressure of its weight upon the foraminous, normally plane surface of a sheet of foamed rubber, then thoroughly wetting the fruit with an aqueous emulsion of waxes and removing surplus emulsion by rolling the fruit under pressure of its weight upon the foraminous, normally plane surface of a sheet of foamed rubber.

3. A process for treating citrus fruit comprising thoroughly wetting the fruit including the stem end and tissue exposed in skin wounds with an aqueous solution of borax in decay inhibiting concentration, removing surplus solution therefrom to leave a thin, substantially uniform film on the generally rotund surface by rolling the fruit under pressure of its weight upon the foraminous, normally plane surface of a sheet of foamed rubber, then subjecting the fruit to standard coloring procedures and then thoroughly wetting the fruit with an aqueous emulsion of waxes, said emulsion containing dissolved in its aqueous phase a decay inhibiting concentration of borax and removing surplus emulsion therefrom to leave a thin, substantially uniform film on the generally rotund surface by rolling the fruit under pressure of its weight upon the foraminous, normally plane surface of a sheet of foamed rubber.

4. A process for treating citrus fruit comprising, rolling the fruit under pressure of its weight upon the foraminous, normally plane surface of a sheet of foamed rubber, said sheet being of a thickness which exceeds the height of the liquid table that it is capable of sustaining by capillarity, and said sheet being saturated with a solution comprising water and borax in decay inhibiting concentration, to the extent that a puddle of emulsion is present against the leading side of the fruit as it is rolled, whereby solution is applied and surplus removed successively as fruit contacting surface areas of said sheet pass from the leading side to the trailing side of the fruit.

5. A process for treating citrus fruit comprising, thoroughly wetting the fruit including the stem end and tissue exposed in skin wounds with a beneficiating liquid, removing surplus liquid therefrom to leave a thin substantially uniform film on the generally rotund surface by rolling the fruit under pressure of its weight upon the foraminous, normally plane surface of a sheet of foamed rubber, then thoroughly wetting the fruit with an aqueous emulsion of waxes and removing surplus emulsion by rolling the fruit under pressure of its weight upon the foraminous, normally plane surface of a sheet of foamed rubber.

6. A process for treating citrus fruit comprising, thoroughly wetting the fruit including the stem end and tissue exposed in skin wounds with a beneficiating liquid, and removing surplus liquid therefrom to leave a thin, substantially uniform film on the generally rotund surface by rolling the fruit under pressure of its weight upon the foraminous, normally plane surface of a sheet of foamed rubber.

7. Process for beneficiating fruit of substantially rotund shape to improve its marketability comprising, wetting the entire surface with a beneficiating liquid, and removing surplus liquid therefrom to such extent as to leave an extremely thin substantially uniform film upon the rotund surface thereof, by rolling the fruit in pressure contact with the normally plane foraminous upper surface of a sheet of foamed rubber.

ERNEST M. BROGDEN.

REFERENCES CITED

The following references are of record in the file of this patent:

UNITED STATES PATENTS

| Number | Name | Date |
|---|---|---|
| 1,618,159 | Ahlburg | Feb. 22, 1927 |
| 1,700,908 | Ricketts | Feb. 5, 1929 |
| 1,964,429 | Eberts | June 26, 1934 |
| 2,042,857 | Nelson | June 2, 1936 |
| 2,070,936 | Trowbridge | Feb. 16, 1937 |
| 2,145,495 | Paxton | Jan. 31, 1939 |